US011281234B2

(12) United States Patent
Gorsica et al.

(10) Patent No.: US 11,281,234 B2
(45) Date of Patent: Mar. 22, 2022

(54) METHODS AND SYSTEMS FOR CRASHING UNMANNED AIRCRAFT (71) Applicant: Motorola Mobility LLC, Chicago, IL (US)

(72) Inventors: John Gorsica, Round Lake, IL (US); Rachid Alameh, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 231 days.

(21) Appl. No.: 16/228,161

(22) Filed: Dec. 20, 2018

(65) Prior Publication Data

US 2020/0201358 A1 Jun. 25, 2020

(51) Int. Cl.
*G05D 1/04* (2006.01)
*B64C 39/02* (2006.01)

(52) U.S. Cl.
CPC .......... *G05D 1/042* (2013.01); *B64C 39/024* (2013.01); *B64C 2201/14* (2013.01); *B64C 2201/18* (2013.01)

(58) Field of Classification Search
CPC combination set(s) only.
See application file for complete search history.

(56) References Cited

U.S. PATENT DOCUMENTS

| 9,016,622 | B1* | 4/2015 | Pasternak | B64B 1/62 244/97 |
| 9,459,620 | B1* | 10/2016 | Schaffalitzky | G06Q 10/083 |
| 9,663,227 | B1* | 5/2017 | Lema | G05D 1/0016 |
| 2016/0232795 | A1* | 8/2016 | Thiele | G05D 1/0022 |
| 2017/0092109 | A1* | 3/2017 | Trundle | H04B 7/18504 |
| 2017/0235308 | A1* | 8/2017 | Gordon | B64C 39/024 701/2 |
| 2018/0086451 | A1* | 3/2018 | Vaughn | G08G 5/0069 |
| 2018/0129200 | A1* | 5/2018 | Tian | G06F 3/0304 |
| 2018/0173220 | A1* | 6/2018 | Wang | B64C 27/006 |
| 2018/0196419 | A1* | 7/2018 | Wang | G05D 1/0094 |
| 2018/0203442 | A1 | 7/2018 | Kotlyarov | |
| 2018/0239356 | A1 | 8/2018 | Hall | |
| 2018/0251219 | A1* | 9/2018 | Taylor | G06F 3/017 |

(Continued)

OTHER PUBLICATIONS

Fayjie, et al., "Voice enabled smart drone control", Article published on IEE Explore; https://ieeexplore.ieee.org/document/7993759/ Added Jul. 27, 2017.

(Continued)

*Primary Examiner* — Jeff A Burke
*Assistant Examiner* — Zachary Joseph Wallace
(74) *Attorney, Agent, or Firm* — Philip H. Burrus, IV (57) ABSTRACT An unmanned aircraft includes one or more sensors. The sensors identify a predefined crash command from an environment about the unmanned aircraft. One or more processors, operable with the one or more sensors, then determine whether a source of the predefined crash command is authorized to crash the unmanned aircraft. Where the source of the predefined crash command is authorized to crash the unmanned aircraft, the one or more processors crash the unmanned aircraft. Where the source of the command requesting the unmanned aircraft to stop flying is unauthorized to crash the unmanned aircraft, the one or more processors can land the unmanned aircraft without crashing.

20 Claims, 5 Drawing Sheets

(56) References Cited

U.S. PATENT DOCUMENTS

2018/0321676 A1* 11/2018 Matuszeski .......... G05D 1/0055
2018/0332213 A1    11/2018 Kucharski et al.
2019/0202449 A1*  7/2019 Taveira ................ G05D 1/0202

OTHER PUBLICATIONS

Kr, et al., "Controlling robots through intelligent mobiles for mlitary purpose", Article on IEEE Xplore; https://ieeexplore.ieee.org/document/8389874/ Added Jun. 21, 2018.

"CSC Safety", PhantonHelp Store; https://www.phantomhelp.com/store/phantom-3-csc-safety/; Unknown publication date but prior to filing of present application.

"Quadrone Voice Controlled 4 Channel Quadcopter Drone", Found on Amazon; Unknown Publication date bur prior to filing of present application; https://www.amazon.com/Quadrone-Voice-Controlled-Channel-Quadcopter/dp/B014212G9A.

"SkyRover Voice Command Drone", Drone found on Amazon; https://www.amazon.com/SkyRover-YW858090-Voice-Command-Drone/dp/B01JUO0UVA; Unknown Publication date but prior to filing of present application.

Ackerman, Even, "How to Fly a Drone with Your Face", Article on IEEE Spectrum; https://spectrum.ieee.org/automaton/robotics/drones/how-to-fly-a-drone-with-your-face Publication Jan. 31, 2018.

Biewald, Lukas, "How to build an autonomous, voice-controlled, face-recognizing drone for $200", How To Instructions on OReilly.com; https://www.oreilly.com/ideas/how-to-build-an-autonomous-voice-controlled-face-recognizing-drone-for-200 Published Oct. 25, 2016.

Imetomi, "Voice Controlled Arduino Drone", How To on Instructables; https://www.instructables.com/id/SpeechVoice-Controlled-Arduino-Drone/; Unknown Publication date but prior to filing of present application.

Johnstone, Dave, "The Secret Kill Switch on your DJI Spark Drone", Published Jul. 12, 2017 on Drone Reviews and News; https://dronereviewsandnews.com/the-secret-kill-switch-on-your-dji-spark-drone/.

Synan, Chris, "Voice Controlled Drone with RasPi, Amazon Echo and 3DR IRIS+", How To Instructions; Article on Hackster.io; https://www.hackster.io/veggiebenz/voice-controlled-drone-with-raspi-amazon-echo-and-3dr-iris-c9fd2a Published Feb. 7, 2016.

* cited by examiner

METHODS AND SYSTEMS FOR CRASHING UNMANNED AIRCRAFT

BACKGROUND

Technical Field

This disclosure relates generally to unmanned aircraft, and more particularly to methods and systems for controlling unmanned aircraft.

Background Art

The use of unmanned aircraft, commonly known as "drones," is becoming more popular. Drones can be equipped with cameras to capture images or video from the air. Drones can be used to carry objects efficiently from one location to another. Hobbyists also use drones for recreational purposes. When used by a skilled operator in open airspace, drones can perform tasks such as capturing high altitude images very efficiently. As with any flying machine, there is always the risk that a drone may inadvertently collide with another object. It would be advantageous to have an improved method and system for controlling unmanned aircraft to reduce this risk.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include and explain various principles and advantages embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to controlling unmanned aircraft, thereby causing the unmanned aircraft to crash. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to unmanned aircraft and/or the associated user interface technology, improve the functioning of the unmanned aircraft itself by and improving the overall user experience by avoiding collisions to overcome problems specifically arising in the realm of the technology associated with unmanned aircraft-user interaction.

It will be appreciated that embodiments of the disclosure described herein may be comprised of one or more conventional processors and unique stored program instructions that control the one or more processors to implement, in conjunction with certain non-processor circuits, some, most, or all of the functions of causing unmanned aircraft to crash as described herein. The non-processor circuits may include, but are not limited to, a radio receiver, a radio transmitter, signal drivers, clock circuits, power source circuits, and user input devices. As such, these functions may be interpreted as steps of a method to perform the steps of detecting commands to stop flying, verifying whether the source of such commands is authorized to cause a crash or immediate land, and thereafter crashing the unmanned aircraft. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide methods and systems for controlling unmanned aircraft, which are also known as "unmanned aerial vehicles" or "UAVs," or "drones." Those terms refer interchangeably herein to flying machines that are controlled remotely by an operator, and that do not have a biological pilot onboard. Illustrating by example, an unmanned aircraft or drone can include a vehicle capable of flight or navigation without the assistance of an onboard, human pilot, relying instead upon flight and navigation commands received wirelessly from a remotely controlled device.

Embodiments of the disclosure contemplate that there are situations in which an unmanned aircraft needs to be stopped, and stopped quickly. Illustrating by example, when a drone is being controlled by an inexperienced "pilot" (a remote operator) in cramped airspace, unintentional situations can arise in which the drone might collide with a person, a pet, or an expensive piece of property, e.g., a Faberge egg. In such situations, a person not piloting the drone may need to stop the drone regardless of the pilot's intentions or lack of skill or attention, and regardless of the drone's orientation, flight path, or then occurring task. If, for example, a child is flying a drone straight toward their parent's face, not understanding the fact that this may injure the parent, the parent may have cause to stop the drone immediately to avoid injury.

Embodiments of the disclosure provide methods and systems for stopping unmanned aircraft immediately in such situations. Embodiments of the disclosure contemplate that in these situations there may not be enough time to safely land the drone, as doing so may require a deceleration of the drone across a distance that is not acceptable. Continuing the example above, if the child is flying a drone toward the parent's face at ten miles per hour with the drone ten feet from the parent's head, if a controlled landing would require twenty feet of deceleration to stop the drone, there is simply not enough time for such a landing to prevent injury.

Accordingly, embodiments of the disclosure provide more immediate methods and systems for stopping unmanned aircraft where the object toward which the drone is flying is prioritized over the drone itself. To wit, methods and systems of the disclosure provide techniques for stopping a drone in which concern for the mechanical structure of the drone is disregarded to prevent a collision or injury. In one or more embodiments, the method and systems provided herein cause an intentional crash by the drone in which it collides violently with the ground or another object to avoid colliding with an object having higher priority in value than the drone.

In one or more embodiments, an unmanned aircraft is equipped with one or more sensors. The one or more sensors detect a command for the unmanned aircraft to stop flying. Since crashing the unmanned aircraft to suffer physical damage and potentially be destroyed, in one or more embodiments the methods and systems—prior to crashing—verify whether the person delivering the command for the unmanned aircraft to stop flying is authorized to crash the unmanned aircraft. Said differently, methods and systems verify whether a source of the command for the unmanned aircraft to stop flying is authorized to damage the unmanned aircraft by crashing the same.

Thus, in one or more embodiments, the methods and systems described herein identify, with the one or more sensors, whether an authorized user of the unmanned aircraft is the source of the command for the unmanned aircraft to stop flying. In other embodiments, even where the source of the command is an authorized user of the unmanned aircraft, the methods and systems will verify whether that unauthorized user has credentials allowing the authorized user to cause the unmanned aircraft to sustain damage by crashing.

Such verification serves to ensure that only authorized users or those having sufficient authorization credentials are allowed to crash the unmanned aircraft, thereby preventing hijackers, thieves, or miscreants from destroying the same. Where the person is not an authorized user and/or fails to have sufficient authorization credentials to cause damage to the unmanned aircraft, they may be able to cause the unmanned aircraft to land or dock without crashing. However, in one or more embodiments they will be precluded from crashing the unmanned aircraft.

In one or more embodiments, where the source of the command to stop flying is an authorized user and/or has authorization credentials to cause the unmanned aircraft to sustain damage by crashing, one or more processors of the unmanned aircraft cause, in response to the command to stop flying, the unmanned aircraft to crash. This can occur, for example, by the one or more processors causing a termination of the delivery of power to the flight engine and/or propeller system. Thus, if the one or more processors "cut" power to the flight engine, the unmanned aircraft is sent into free-fall, which results in a crash rather than a controlled landing.

In one or more embodiments, an unmanned aircraft includes one or more sensors, which may include an imager for capturing video or still images, one or more audio capture devices such as microphones, infrared scanning devices, or other sensors. These sensors carried by the unmanned aircraft monitor an environment about the unmanned aircraft for a command for the unmanned aircraft to immediately stop flying. As will be described in more detail below, these commands can include gestures, repeated gestures, screams, predefined audible commands, repeated audible commands, radio frequency signals received from a companion device such as a smartphone or smart watch, and so forth.

In one or more embodiments, when such a command to immediately stop flying is detected, one or more processors carried by the unmanned aircraft and operable with the one or more sensors may optionally compare the command to one or more reference commands to ensure authenticity and validity. For instance, the one or more processors may compare a gesture to one or more pre-recorded gestures stored in memory, or a voice command to one or more pre-stored voice commands, to confirm that the command to stop flying the unmanned aircraft is (1) authentic and valid and optionally (2) from a person authorized to damage the unmanned aircraft via damage. In another embodiment where the drone carries no sensors, a received radio frequency signal from a companion device can signal that a user is authenticated to crash the unmanned aircraft.

In some embodiments, the one or more processors may also determine an urgency of the command for the unmanned aircraft to stop flying. Illustrating by example, while a raised hand with palm outward may be a command for the unmanned aircraft to stop flying, a violently waving hand combined with a high-pitched scream or the repeated words "STOP! STOP! STOP!" may be an urgent command.

Where the person is authorized to damage the unmanned aircraft by crashing, and optionally where the command for the unmanned aircraft to stop flying is urgent, in one or more embodiments flight propulsion is immediately terminated, thereby allowing gravity to pull the unmanned aircraft toward the earth, resulting in a crash when the unmanned aircraft hits the earth or an intervening object, e.g., the side of a car. While likely causing physical damage to the unmanned aircraft, or even rendering it inoperable, embodiments of the disclosure contemplate that in many situations this is far preferable to the drone hitting an object of value like a person's face or the family pet.

Figure 1:
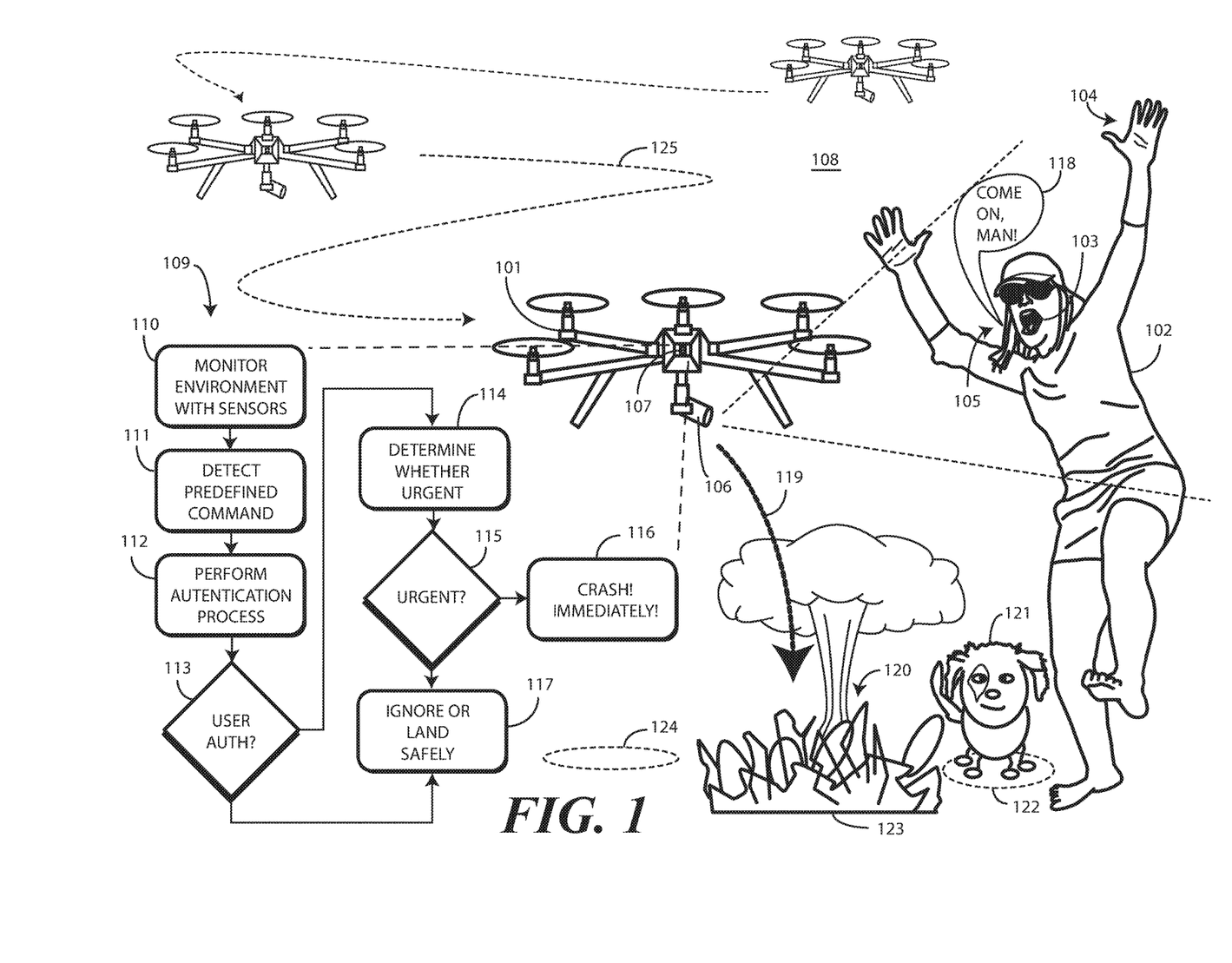
FIG. 1 illustrates one explanatory system in accordance with one or more embodiments of the disclosure.

Turning now to FIG. 1, illustrated therein is an unmanned aircraft 101 that is being flown along a flight path 125. A remote operator may be remotely controlling the unmanned aircraft 101 with a control device (not shown). Alternatively, an artificial intelligence system may be controlling the unmanned aircraft 101. Other sources of remotely controlling the unmanned aircraft 101 will be obvious to those of ordinary skill in the art having the benefit of this disclosure.

For whatever reason—absence of attention, malicious intent, inadvertent error, insufficient environmental sensing, or other reasons—the flight path 125 of the unmanned aircraft 101 has the unmanned aircraft 101 careening toward a person 102. Left unabated, it appears clear that the unmanned aircraft 101 will soon collide with the person's face 103.

Not wanting to sustain personal injury, the person 102 issues a command 104 for the unmanned aircraft 101 to stop flying. In this illustrative embodiment, the command 104 is a gesture, shown illustratively as two raised hands. Other examples of commands 104 for the unmanned aircraft 101 to stop flying will be described below. Still others will be obvious to those of ordinary skill in the art having the benefit of this disclosure.

In addition to issuing the command 104 for the unmanned aircraft 101 to stop flying, the person 102 delivers a signal 105 that the command 104 is urgent. In this illustrative embodiment, the signal 105 that the command 104 is urgent comprises a scream (indicated by the person's open mouth) having a pitch or volume exceeding a predefined pitch or volume threshold. Other examples of demonstrating urgency for the command 104 for the unmanned aircraft 101 to stop flying will be described below. Still others will be obvious to those of ordinary skill in the art having the benefit of this disclosure.

In one or more embodiments, the unmanned aircraft 101 is equipped with one or more sensors. Examples of such sensors will be described below with reference to FIG. 2. However, in one embodiment the sensors comprise an image capture device 106 and an audio capture device 107. In one or more embodiments, the unmanned aircraft 101 also carries one or more processors (shown below in FIG. 2) that are operable with the image capture device 106 and the audio capture device 107.

As noted above, the one or more processors can be operable with a memory storing unique stored program instructions that control the one or more processors to implement, in conjunction with certain non-processor circuits, some, most, or all of the functions of controlling the unmanned aircraft 101. FIG. 1 illustrates one explanatory method 109 for controlling the unmanned aircraft 101.

As shown at step 110, in one or more embodiments when the unmanned aircraft 101 is flying along the flight path 125, the various sensors carried by the unmanned aircraft 101 monitor the environment 108 in which the unmanned aircraft 101 is flying. At step 111, upon turning toward the person 102, the sensors of the unmanned aircraft 101 detect the command 104 for the unmanned aircraft 101 to stop flying. In this example, the image capture device 106 detects the "two hands up" gesture made by the person 102, with the one or more processors performing image analysis on still or video images captured by the image capture device 106 to confirm that this is in deed a command 104 for the unmanned aircraft 101 to stop flying.

As noted above, in one or more embodiments only authorized users are allowed to crash the unmanned aircraft 101 to prevent, for example, hijacking or malicious destruction of the unmanned aircraft 101. While other users may be allowed to ask the unmanned aircraft 101 to land or dock conventionally, in one or more embodiments they are prevented from causing the unmanned aircraft 101 to sustain damage by crashing. Accordingly, in one or more embodiments step 112 of the method 109 initiates an authentication process.

The authentication process of step 112 can occur in a variety of ways. Illustrating by example, the one or more processors can compare audio characteristics extracted from audio input received by the audio capture device 107 to audio characteristics stored in a memory carried by the drone to determine whether the received audio input, here the person's scream, and the stored audio input sufficiently match. For example, the one or more processors can determine whether one or more substantially matching audio characteristics are present in both the received audio input and the stored audio input. Alternatively, the one or more processors can also determine whether one or more substantially matching audio characteristics are absent from one of the received audio input or the stored audio input as well.

The one or more processors can also be operable with the image capture device 106. The one or more processors can optionally include a face/context analyzer configured to process an image or depth scan of an object and determine whether the object matches predetermined criteria by comparing the image or depth scan to one or more predefined authentication references stored in memory. For example, the face/context analyzer can identify objects using image recognition, character recognition, visual recognition, facial recognition, color recognition, shape recognition, and the like. Advantageously, the face/context analyzer or the one or more processors can be used as a facial recognition device to determine the identity of one or more persons detected about the unmanned aircraft 101.

The one or more processors can also perform the authentication process of step 112 using the image capture device 106 and the audio capture device 107 in combination. In one embodiment, the one or more processors determine whether the person 102 from whom the command 104 for the unmanned aircraft 101 to stop flying is an authorized user of the unmanned aircraft 101 by capturing one or more of images with the image capture device 106, or depth scans with a depth scanner, to detect lip movements as the command 104 for the unmanned aircraft 101 to stop flying is received. When the unmanned aircraft 101 receives the command 104 for the unmanned aircraft 101 to stop flying, the imager capture device 106 can monitor persons within the environment 108 of the unmanned aircraft 101 to determine who is speaking. The one or more processors can then, using the image analysis described above, determine whether the person delivering the command 104 for the unmanned aircraft 101 to stop flying is an authorized user, and so forth.

In another embodiment, the one or more processors can determine from whom the command 104 for the unmanned aircraft 101 to stop flying is received by analyzing the command 104 itself. In one or more embodiments, the audio capture device 107 receives the command 104 for the unmanned aircraft 101 to stop flying. The one or more processors can then extract one or more audio characteristics from this command 104. Examples of audio characteristics 320 include one or more of pitch, timbre, cadence, rhythm, volume, spectrum, or combinations thereof. Other techniques for identifying the source of the command 104 for the unmanned aircraft 101 to stop flying, as well as whether that source is an authorized user of the unmanned aircraft 101, will be described below. Still others will be obvious to those of ordinary skill in the art having the benefit of this disclosure.

Decision 113 determines whether the source of the command 104 for the unmanned aircraft 101 to stop flying is an authorized user. Where they are not, the command 104 for the unmanned aircraft 101 to stop flying can be used to invoke a conventional landing where the unmanned aircraft 101 does not sustain damage at step 117. This would allow anyone to cause the unmanned aircraft 101 to land safely. Alternatively, the command 104 for the unmanned aircraft 101 to stop flying can be ignored at step 117.

In this illustrative example, person 102 is an authorized user of the unmanned aircraft 101. Accordingly, the method 114 moves to step 114. In one or more embodiments, step 114 optionally includes determining whether the command 104 for the unmanned aircraft 101 to stop flying is urgent. In this illustration, it is, as person 102 emits a loud, high-pitched scream 118 including the word "STOP!" In one or more embodiments, the audio capture device 107 detects this at step 114, with the one or more processors comparing the command 104 for the unmanned aircraft 101 to stop flying to one or both of volume and pitch thresholds. Since the scream 118 exceeds both a predefined pitch threshold and a predefined volume threshold, the one or more processors conclude at decision 115 that the command 104 for the unmanned aircraft 101 to stop flying is indeed urgent. In one embodiment, control operations such as causing the unmanned aircraft 101 to crash occur only where the command 104 for the unmanned aircraft 101 to stop flying is urgent.

Since person 102 is an authorized user of the unmanned aircraft 101, and—in this example—since the command 104 for the unmanned aircraft 101 to stop flying is urgent, the method 109 moves to step 116. At step 116, where the authorized user is identified as the source of the command 104 for the unmanned aircraft 101 to stop flying, the one or more processors cause the unmanned aircraft 101 to crash. In the illustrative embodiment of FIG. 1, the one or more processors cause the delivery of power to the engines driving the propellers to cease. This sends the unmanned aircraft 101 into a free fall 119, resulting in a crash 120 when the unmanned aircraft 101 violently collides with the ground. In this example, the unmanned aircraft 101 sustains catastrophic damage due to the crash 120, as it breaks into many pieces and is no longer able to fly. While devastating for the unmanned aircraft 101, the person's face 103 is spared from injury.

Thus, this illustrative example shown in FIG. 1 provides a method 109 of crashing the unmanned aircraft 101. One or more sensors carried by the unmanned aircraft 101 detect a command 104 for the unmanned aircraft 101 to stop flying. Here, the command 104 was a gesture, so the image capture device 106 detected the "two hands up" gesture as a predefined gesture indicating the unmanned aircraft 101 should stop flying.

The one or more sensors then identify person 102 as an authorized user of the unmanned aircraft 101, and further identify that person 102 is the source of the command 104 for the unmanned aircraft 101 to stop flying. Where the authorized user is identified as the source of the command 104 for the unmanned aircraft 101 to stop flying, the one or more processors carried by the unmanned aircraft 101 cause the unmanned aircraft 101 to crash 120.

In this example, the one or more sensors further determined that the command 104 for the unmanned aircraft 101 to stop flying was urgent. The one or more processors determined whether the command 104 for the unmanned aircraft 101 to stop flying was urgent by detecting a volume level associated with the command 104 for the unmanned aircraft 101 to stop flying exceeded a predefined volume level. In this example, the crash 120 occurred only because the command 104 for the unmanned aircraft 101 to stop flying was urgent.

In this embodiment, the unmanned aircraft 101 used sensors to detect a stop request. The sensors detected the stop request. The one or more processors then determined that person 102 issued the stop request, with examples for doing so including recognizing a voiceprint from the scream 118 and/or facial recognition by analyzing images captured by the image capture device. The one or more processors then determined that person 102 is an approved user authorized to both issue stop commands and to crash the unmanned aircraft 101. The one or more processors then cut the power to the motors driving the propellers to cause the unmanned aircraft 101 to crash 120 immediately.

Figure 2:
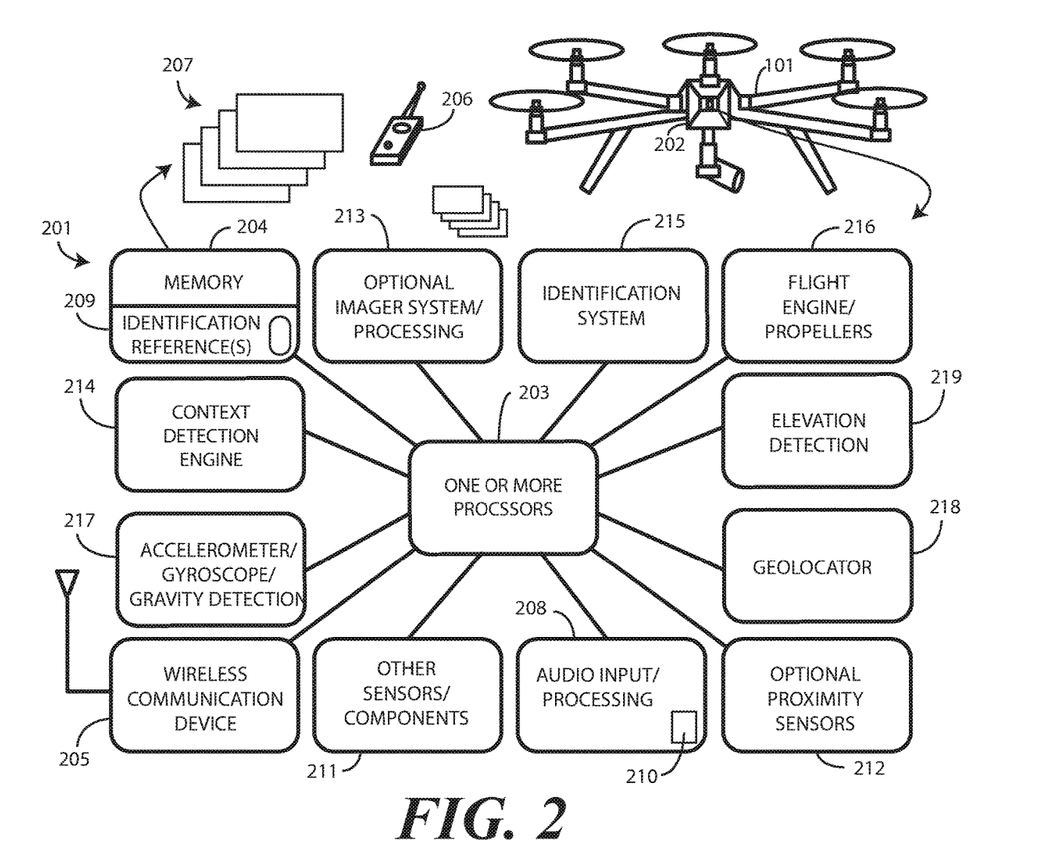
FIG. 2 illustrates one explanatory unmanned aircraft in accordance with one or more embodiments of the disclosure.

Turning now to FIG. 2, illustrated therein is one explanatory unmanned aircraft 101 configured in accordance with one or more embodiments of the disclosure. An explanatory block diagram schematic 201 is also shown in FIG. 2. The block diagram schematic 201 can be configured as a printed circuit board assembly disposed within a housing 202 of the unmanned aircraft 101. Various components can be electrically coupled together by conductors or a bus disposed along one or more printed circuit boards.

The illustrative block diagram schematic 201 of FIG. 2 includes many different components. Embodiments of the disclosure contemplate that the number and arrangement of such components can change depending on the particular application. Accordingly, drones and unmanned aerial vehicles configured in accordance with embodiments of the disclosure can include some components that are not shown in FIG. 2, and other components that are shown may not be needed and can therefore be omitted.

In one embodiment, the unmanned aircraft 101 includes one or more processors 203. The one or more processors 203 can include a microprocessor, a group of processing components, one or more ASICs, programmable logic, or other type of processing device. The one or more processors 203 can be operable with the various components of the block diagram schematic 201. The one or more processors 203 can be configured to process and execute executable software code to perform the various functions of the unmanned aircraft 101 with which the block diagram schematic 201 operates. A storage device, such as memory 204, can optionally store the executable software code used by the one or more processors 203 during operation.

In this illustrative embodiment, the block diagram schematic 201 also includes a wireless communication device 205 that can be configured for wireless communication with a control device 206, or alternatively with one or more other devices. The wireless communication device 205 may utilize wireless technology for communication, such as, but are not limited to, peer-to-peer or ad hoc communications, as well as other forms of wireless communication. The wireless communication device 205 can include wireless communication circuitry, one of a receiver, a transmitter, or transceiver, and one or more antennas.

In one embodiment, the one or more processors 203 can be responsible for performing the primary functions of the unmanned aircraft 101 with which the block diagram schematic 201 is operational. The executable software code used by the one or more processors 203 can be configured as one or more modules 207, which can include a voice recognition engine, a facial recognition engine, or combinations thereof in one embodiment, and that are operable with the one or more processors 203. Such modules 207 can store instructions, control algorithms, and so forth.

In one or more embodiments, the block diagram schematic 201 includes an audio processing engine 208, which functions in coordination with the one or more processors 203 in one or more embodiments. In one or more embodiments, the audio processing engine 208 is capable of receiving audio input, processing audio input, extracting one or more audio characteristics from received audio input, storing one or more voice prints or the extracted audio characteristics as identification references 209 in the memory 204, and performing other functions. For example, in one or more embodiments the audio processing engine 208 is operable to receive audio input from an environment about the unmanned aircraft 101.

The audio processing engine 208 can include hardware, executable code, and speech monitoring and generation executable code in one embodiment. The audio processing engine 208 can be operable with one or more identification references 209 stored in memory 204. These identification references 209 can include audio characteristics extracted from received audio input, voice prints, audio identification models, or other data structures suitable for use by the one or more processors 203 to uniquely identify received voice input.

In some embodiments, a voice signature has to be satisfied before authentication takes place. For example, if the voice is too loud (indicating urgency), or a specific previously stored word is heard, then voice or face can be authenticated for identity match before crashing the unmanned aircraft. Such an embodiment has the benefit of only authenticating when certain prerequisites are met saving power and processor loading. In one or more embodiments, this command could also be a two-step command, e.g., first a shout that shout grabs the attention of the unmanned aircraft (perhaps turning additional sensors ON), and then second the user makes a gesture (second command) as an example to complete the shut down process.

For instance, with reference to audio input, the identification references 209 can comprise representations of basic speech models, representations of trained speech models, or other representations of predefined audio sequences that are used by the audio processing engine 208 or the one or more processors 203 to receive and identify voice commands from audio input captured by an audio capture device (107) such as the one or more microphones 210. (In some situations the audio processing engine 208 is supported by other device sensors.) In one embodiment, the audio processing engine 208 can include a voice recognition engine. In one embodiment, the audio processing engine 208 can access various speech models stored with the audio identification references 209 to identify not only speech commands, but identifying audio characteristics extracted from the audio input signals corresponding to those speech commands.

The audio processing engine 208 can be operable with one or more microphones 210. Illustrating by example, a first microphone can be located on a first side of the unmanned aircraft 101 for receiving audio input from a first direction, while a second microphone can be placed on a second side of the unmanned aircraft 101 for receiving audio input from a second direction.

In one embodiment, the audio processing engine 208 is configured to implement a voice control feature that allows a user to speak a specific device command to cause the one or more processors 203 to execute a control operation. For example, the user may say, "Land Now!" This statement comprises a device command requesting the one or more processors 203 to respond by causing the unmanned aircraft 101 to land without damage. In one embodiment the audio processing engine 208 listens for voice commands, processes the commands and, in conjunction with the one or more processors 203, initiates actions or processes in response to the commands.

Other sensors and components 211 can be operable with the one or more processors 203. General examples of the sensors included with the other sensors and components 211 include time sensors, environmental sensors, weather sensors, location sensors, and so forth. These sensors or components 211 can be used alone or in various combinations. These other sensors and components 211 can include light sensors, magnetometers, laser measuring devices, and so forth. The other sensors and components 211 can include input and output components, such as power inputs and outputs and/or mechanical inputs and outputs. Still other components will be obvious to those of ordinary skill in the art having the benefit of this disclosure.

A temperature sensor can be configured to monitor the temperature of the environment about the unmanned aircraft 101. A light sensor can be used to detect whether or not ambient light is incident on the housing 202 of the unmanned aircraft 101. A location sensor can be included for determining a location and/or movement of the unmanned aircraft 101. Other examples of sensors will be obvious to those of ordinary skill in the art having the benefit of this disclosure.

The other sensors and components 211 can also include a motion sensor, which can include one or more accelerometers or gyroscopes. In one embodiment the motion sensors are operable to detect movement, and direction of movement, of the unmanned aircraft 101. The motion sensors can optionally be configured as an orientation detector that determines an orientation and/or movement of the unmanned aircraft 101 in three-dimensional space. The orientation detector can determine the spatial orientation of an unmanned aircraft 101 in three-dimensional space by, for example, detecting a gravitational direction. The other sensors and components 211 can also be radio frequency receivers receiving beacon transmissions from remote devices as well.

The unmanned aircraft 101 can optionally include one or proximity sensors 212. The proximity sensors 212 can include only a signal receiver to receive signals from objects external to the housing 202 of the unmanned aircraft 101. In one embodiment, the signal receiver is an infrared signal receiver to receive an infrared emission from an object such as a human being when the unmanned aircraft 101 is approaching a person. In one or more embodiments, the proximity sensors 212 are configured to receive infrared wavelengths of about four to about ten micrometers. This wavelength range is advantageous in one or more embodiments in that it corresponds to the wavelength of heat emitted by the body of a human being.

The proximity sensors 212 can also include transmitter/receiver pairs. These sensors including both a signal emitter and a corresponding signal receiver can be any one of various types of proximity sensors, such as but not limited to, capacitive, magnetic, inductive, optical/photoelectric, imager, laser, acoustic/sonic, radar-based, Doppler-based, thermal, and radiation-based proximity sensors. In one or more embodiments they include infrared transmitters and receivers.

The unmanned aircraft 101 can optionally include an imaging system 213. The imaging system 213 can include an imager such as the image capture device (106) shown in FIG. 1. In one embodiment, the imager comprises a two-dimensional imager configured to receive at least one image of an environment (108) of the unmanned aircraft 101. In one embodiment, the imager comprises a two-dimensional Red-Green-Blue (RGB) imager. In another embodiment, the imager comprises an infrared imager. Other types of imagers will be obvious to those of ordinary skill in the art having the benefit of this disclosure.

The imaging system 213 can also optionally include a depth scanner. Where included, the depth scanner can take a variety of forms. In a first embodiment, the depth scanner comprises a pair of imagers separated by a predetermined distance, such as three to four images. This "stereo" imager works in the same way the human eyes do in that it captures images from two different angles and reconciles the two to determine distance.

In another embodiment, the depth scanner employs a structured light laser. The structured light laser projects tiny light patterns that expand with distance. These patterns project on a surface, such as a user's face, and are then captured by an imager. By determining the size and spacing between the elements of the pattern, three-dimensional mapping can be obtained.

In still another embodiment, the depth scanner comprises a time of flight device. Time of flight three-dimensional sensors include a laser that emits laser light, with a photodiode array receiving reflected light. These pulses reflect back from a surface, such as the user's face. The time it takes for pulses to move from the photodiode array to the surface and back determines distance, from which a three-dimensional mapping of a surface can be obtained. Where included, the depth scanner adds a third "z-dimension" to the x-dimension and y-dimension defining the two-dimensional image captured by the imager of the imaging system 213.

Other components can be operable with the one or more processors 203, and can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker or other alarms and/or buzzers.

A context engine 214 can then operable with the various sensors to detect, infer, capture, and otherwise determine persons and actions that are occurring in an environment (108) about the unmanned aircraft 101. For example, where included one embodiment of the context engine 214 determines assessed contexts and frameworks using adjustable algorithms of context assessment employing information, data, and events. These assessments may be learned through repetitive data analysis. The context engine 214 can comprise an artificial neural network or other similar technology in one or more embodiments.

In one or more embodiments, the context engine 214 is operable with the one or more processors 203. In some embodiments, the one or more processors 203 can control the context engine 214. In other embodiments, the context engine 214 can operate independently, delivering information gleaned from detecting multi-modal social cues, emotional states, moods (such as eminent fear), and other contextual information to the one or more processors 203. The context engine 214 can receive data from the various sensors. In one or more embodiments, the one or more processors 203 are configured to perform the operations of the context engine 214.

The unmanned aircraft 101 can also include an identification system 215. The identification system 215 can be used to compare audio characteristics extracted from received audio input to stored audio characteristics to determine whether the received audio input and the stored audio input sufficiently match.

The identification system 215 can also be operable with the imaging system 213, where included. The identification system 215 can optionally include a face/context analyzer configured to process an image or depth scan of an object and determine whether the object matches predetermined criteria by comparing the image or depth scan to one or more predefined identification references 209 stored in memory 204.

For example, the face/context analyzer can identify objects using image recognition, character recognition, visual recognition, facial recognition, color recognition, shape recognition, and the like. Advantageously, the face/context analyzer, operating in tandem with the identification system 215, can be used as a facial recognition device to determine the identity of one or more persons detected about the unmanned aircraft 101.

In one embodiment, the identification system 215 determines from whom audio input is received by capturing one or more of images with the imager or depth scans with the depth scanner to detect lip movements as the audio input is received. Illustrating by example, when the unmanned aircraft 101 receives the audio input, the imaging system 213 can monitor persons within the environment of the unmanned aircraft 101 to determine who is speaking. In another embodiment, the identification system 215 can determine from whom audio input is received by analyzing the audio input itself, as noted above.

The unmanned aircraft 101 can further include a flight engine 216. In one embodiment, the flight engine 216 can include one or more rotary wings. Illustrating by example, the flight engine 216 can include four, six, or eight or more rotors configured as propellers. These propellers can be movable between a generally downward oriented direction to directions tilting forward, aft, and side-to-side so as to move the unmanned aircraft 101 up and down and side to side as desired.

In another embodiment, the flight engine 216 can include an air storage bladder, similar to that used in a blimp. Warm air or buoyant gas can be stored in the bladder to give the unmanned aircraft 101 lift. Releasing the buoyant gas or cooling the air can cause the unmanned aircraft 101 to sink. Of course, combinations of rotary wings and the air storage bladder can be used as well.

An operator or "pilot" can use the control device 206 to control the flight engine 216 to move the unmanned aircraft 101 as desired in one or more embodiments. In other embodiments, one or more firmware modules 207 can be stored in the memory 204 so that the unmanned aircraft 101 can perform flight operations and can fly flight patterns autonomously. Of course, a combination of user driven control through the control device 206 and autonomous flight action can also be implemented.

In one or more embodiments, the flight engine 216 can include an energy storage device, such as a lithium-ion or lithium-polymer battery, that selectively propels the rotary wings or propellers in response to control signals from the one or more processors 203. Each propeller can be a two, three, four, or more bladed assembly. Increasing propeller blades decreases noise and increases thrust, while decreasing propeller blades increases efficiency. The exact number of blades or propellers can be selected based upon design, geographic location, typical wind and weather conditions, and so forth. The one or more processors 203 can deliver control signals to the flight engine 216 to adjust and change the speeds of each motor driving each propeller to control the speed, direction, and motion of the unmanned aircraft 101. When a crash is desired, the one or more processors 203 can stop power from being delivered from the energy storage device to the flight engine to stop each motor driving each propeller, thereby causing the unmanned aircraft 101 to begin a free fall.

In one or more embodiments, the unmanned aircraft 101 includes one or more orientation sensors 217, such as one or more accelerometers, gyroscopes, gravity detectors, or other devices that can determine the azimuth, plumb, and tilt of the unmanned aircraft 101 when in operation. For example, an accelerometer may be used to show vertical orientation, constant tilt and/or whether the unmanned aircraft 101 is stationary or in motion. A gyroscope can be used in a similar fashion. In addition to, or instead of, an accelerometer and/or gyroscope, an electronic compass can be included to detect the spatial orientation of the unmanned aircraft 101 relative to the earth's magnetic field.

The orientation sensors 217 can be used to determine the spatial orientation of the unmanned aircraft 101 when in operation as well. In one embodiment, the one or more orientation sensors 217 make such determinations by detecting a gravitational direction. A geolocator 218 can determine a latitude and longitude coordinate location for the unmanned aircraft 101. In one embodiment, geolocator 218 comprises a Global Positioning System (GPS) device that determines latitudinal and longitudinal coordinates from a constellation of one or more earth orbiting satellites or from a network of terrestrial base stations. Other systems can be used in place of the GPS system, such as the Global Orbiting Navigation System (GLONASS) or other satellite positioning systems. The geolocator 218 may also be able to determine location of the unmanned aircraft 101 by locating or triangulating terrestrial base stations of a traditional cellular network or from other local area networks.

An elevation detector 219, such as an altimeter, can be included to determine an altitude of the unmanned aircraft 101 while in operation. Other components could be included as well, as the unmanned aircraft 101 of FIG. 1 is illustrative only. Numerous other configurations will be obvious to those of ordinary skill in the art having the benefit of this disclosure.

Figure 3:
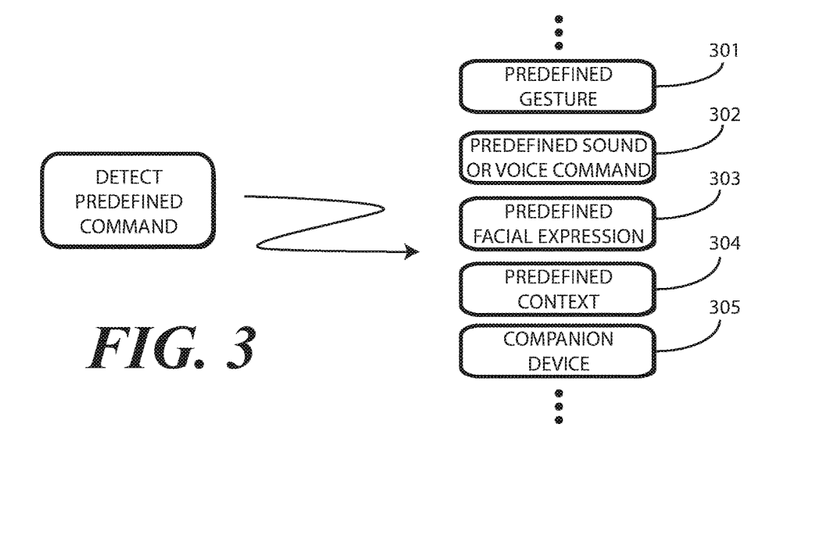
FIG. 3 illustrates explanatory predefined commands that can be used with methods and systems in accordance with one or more embodiments of the disclosure.

In one or more embodiments, the sensors of the unmanned aircraft 101, e.g., the imaging system 213 and the audio processing engine 208, identify a predefined crash command from an environment about the unmanned aircraft 101. Turning briefly to FIG. 3, illustrated therein are some examples of predefined crash commands in accordance with one or more embodiments of the disclosure. Still other predefined crash commands will be obvious to those of ordinary skill in the art having the benefit of this disclosure.

In one embodiment, the predefined crash command comprises a predefined gesture 301. Recall from above that in the illustrative embodiment of FIG. 1, the predefined gesture 301 constituting a predefined crash command comprised a person putting two hands in the air. Other examples of a predefined gesture 301 that can be used as a predefined crash command including holding up an open palm between a person's face and the image capture device (106) of the unmanned aircraft (101), swinging an object, such as a baseball bat, broom, or tennis racquet toward the unmanned aircraft (101), driving a closed first toward the unmanned aircraft (101), throwing an object, such as a shoe, hat, ball, stone, or bottle, toward the unmanned aircraft (101), placing both arms defensively over the face or head, ducking or stooping down to simulate a dodging action, jumping backwards, falling backwards, stepping sideways, jumping sideways, covering a head with a garment such as a jacket or sweatshirt, moving behind an obstacle such as a car or bench, or making a karate chop or kicking action toward the unmanned aircraft (101). These predefined gestures are illustrative only, as numerous others will be obvious to those of ordinary skill in the art having the benefit of this disclosure.

In another embodiment, the predefined crash command comprises a predefined sound or voice command 302. Recall from above that in the illustrative embodiment of FIG. 1, the predefined sound or voice command 302 comprised a scream having a pitch greater than a predefined pitch threshold and/or a volume greater than a predefined volume threshold. Other examples of a predefined sound or voice command 302 include predefined phrases such as, "Stop," "Whoa Nelly," "Not in the face," "Oh, God, No," "Oh, the humanity," "Crash now," "Its coming right for us," "Halt," "You shall not pass," "What is that," "Don't hit the dog," "Don't hit the kids," "Don't hit that Faberge egg," "Not the Honda.sup.TM," and "Please land!" These predefined voice commands are illustrative only, as numerous others will be obvious to those of ordinary skill in the art having the benefit of this disclosure.

In other embodiments the predefined sound or voice command 302 can comprise a predefined type of sound. Examples of such sounds include screams, shrieks, the thud sound that occurs when a person faints, the sound of garbled words when a frightened person cannot enunciate words properly, yells, groans, grunts, gasps, and so forth. These predefined types of sounds are illustrative only, as numerous others will be obvious to those of ordinary skill in the art having the benefit of this disclosure. In other embodiments, a voice command can comprise a first step, which is thereafter followed by a second command, such as a gesture, to complete the command delivery process. Illustrating by example, a user might whistle first and then say, "Land now!"

In still another embodiment, the predefined crash command can comprise a predefined facial expression 303 identified by the image capture device (106) of the unmanned aircraft (101). Recall from above that in the illustrative embodiment of FIG. 1, that the person (102) had her mouth wide open due to the fact that she was screaming. It is contemplated that some unmanned aircraft (101) will be equipped with imagers by not audio capture devices, so identifying such a predefined facial expression 303 can constitute the identification of a predefined crash command. Examples of predefined facial expressions include a mouth wide open, eyes wide open, raised eyebrows, closed eyes, a scrunched face, and a wince. These predefined facial expressions are illustrative only, as numerous others will be obvious to those of ordinary skill in the art having the benefit of this disclosure.

In still another embodiment, the predefined crash command can comprise a predefined context 304. Illustrating by example, a predefined context 304 in one embodiment could comprise a group of one or more baby strollers. If an image capture device (106) of an unmanned aircraft (101) detects a group of one or more rapidly approaching baby strollers, colliding with the same could be devastating. Accordingly, detection of the group of strollers can comprise detecting the crash command. Other predefined contexts include a group of people, a group of animals, identifying the presence of a valuable object such as a fancy car, grand piano, crystal chandelier, or Faberge egg, glass objects, horticultural objects, and plastic garden flamingos. These predefined contexts are illustrative only, as numerous others will be obvious to those of ordinary skill in the art having the benefit of this disclosure.

In yet another embodiment, the predefined crash command can comprise the presence of a companion device 305. Where the wireless communication device (205) of an unmanned aircraft (101) detects a rapidly approaching companion device 305, such as a smartphone, smart watch, tablet computer, or other drone, this detection can be the detection of a predefined crash command.

It should be noted that the various predefined crash commands can be used in combination. For example, to be a valid predefined crash command in one embodiment may require a predefined gesture, a predefined sound, and the presence of a companion device. By contrast, in other embodiments, only a single predefined crash command may be employed. The choice of the number and combination of predefined crash commands to detect can be selected as a function of application and drone deployment location.

Turning now back to FIG. 2, after the sensors of the unmanned aircraft 101 detect the predefined crash command from the environment, in one or more embodiments the one or more processors 203 determine whether a source of the predefined crash command is authorized to crash the unmanned aircraft 101. In one embodiment, this includes identifying a source of the predefined crash command and determining whether the source is an authorized user of the unmanned aircraft 101. In another embodiment, this includes identifying the source of the predefined crash command and determining whether that source has an authorization credential stored in the memory 204 allowing the source to crash the unmanned aircraft 101. Where multiple authorized users exist, it is contemplated that some will be authorized to crash the unmanned aircraft 101 while others will not. Accordingly, combinations of whether the source is an authorized user and whether the source has an authorization credential stored in memory 204 allowing the source to crash the unmanned aircraft 101 can be required as well.

In one or more embodiments, when the source of the predefined crash command is authorized to crash the unmanned aircraft 101, the one or more processors 203 cause the unmanned aircraft 101 to crash in response to the predefined crash command. In one embodiment, this causation includes turning the flight engine 216 OFF by stopping the flow of power from the energy storage device to the flight engine 216, i.e., "cutting" the power to the flight engine 216. In another embodiment, this causation includes cooling air or forcing buoyant gas out of a bladder or ballast tank to cause the unmanned aircraft 101 to crash. Other techniques for crashing the unmanned aircraft 101 will be obvious to those of ordinary skill in the art having the benefit of this disclosure.

Figure 4:
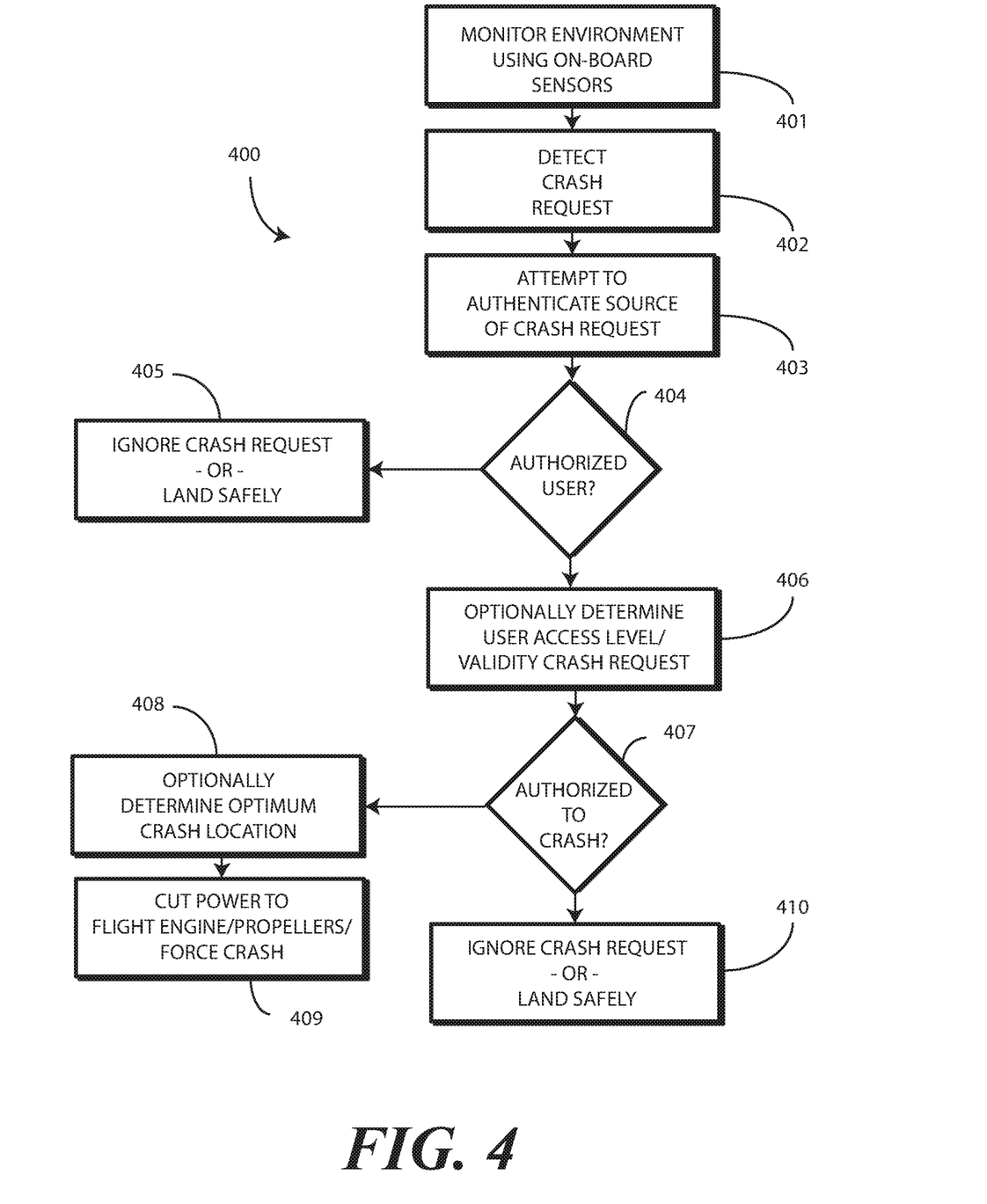
FIG. 4 illustrates one explanatory method in accordance with one or more embodiments of the disclosure.

Turning now to FIG. 4, illustrated therein is one explanatory method 400 in accordance with one or more embodiments of the disclosure. The method 400 is suitable for incorporation into an unmanned aircraft (101) such as that previously described. For example, the method 400 could be configured as one or more modules (207) stored in a memory (204) for execution by the one or more processors (203) of the unmanned aircraft (101).

Beginning at step 401, the method 400 monitors an environment (108) about the unmanned aircraft (101) using one or more sensors. For instance, an image capture device (106) of the unmanned aircraft (101) can visually monitor the environment (108) about the unmanned aircraft (101). Alternatively, one or more microphones (210) can monitor the environment (108) about the unmanned aircraft (101). Moreover, the various sensors can be used in combination. For example, in another embodiment each of the image capture device (106), the microphones (210), and a depth scanner of an imaging system (213) can be used to monitor the environment (108) about the unmanned aircraft (101).

At step 402, the method 400 identifies, with one or more sensors of the unmanned aircraft (101), a command requesting the unmanned aircraft (101) to stop flying. As previously described, the command requesting the unmanned aircraft (101) to stop flying can include a predefined gesture, a predefined sound, a predefined voice command, a predefined type of sound, a predefined facial expression, a predefined context, or the presence of a companion device. These commands requesting the unmanned aircraft (101) can be used alone or in combination. Moreover, additional examples of commands requesting the unmanned aircraft (101) to stop flying will be obvious to those of ordinary skill in the art having the benefit of this disclosure.

At step 403, the method 400 attempts to authenticate a source of the command requesting the unmanned aircraft (101) to stop flying. In one embodiment, step 403 comprises identifying, through facial recognition, voice recognition, or other identification techniques, the source of the command for the unmanned aircraft (101) to stop flying. In one or more embodiments, for the unmanned aircraft (101) to respond to the command for the unmanned aircraft (101) to stop flying, the source of the command must be an authorized user, as determined at decision 404. Where the source of the command for the unmanned aircraft (101) to stop flying is not an authorized user, the method 400 can ignore the command or, alternatively, cause the unmanned aircraft (101) to land safely at step 405. Thus, step 405 can include landing the unmanned aircraft (101) without crashing where the source of the command requesting the unmanned aircraft (101) to stop flying is unauthorized to crash the unmanned aircraft (101).

Where the source of the command for the unmanned aircraft (101) to stop flying is an authorized user, the method 400 can optionally attempt to determine whether the source of the command requesting the unmanned aircraft (101) to stop flying is authorized to crash the unmanned aircraft (101) at step 406. As noted above, there can be situations where there are multiple authorized users, or no authorized users, but some of either group will be authorized to crash the unmanned aircraft (101) while others are not. Step 406 can include performing facial recognition, voice recognition, or other identification techniques and comparing the identity of the source of the command for the unmanned aircraft (101) to stop flying to one or more authentication credentials stored in the memory (204) of the unmanned aircraft (101).

Whether the source of the command for the unmanned aircraft (101) to stop flying is authorized to crash the unmanned aircraft (101) is determined at decision 407. Where the source of the command for the unmanned aircraft (101) to stop flying is not authorized to crash the unmanned aircraft (101), the method 400 can ignore the command or, alternatively, cause the unmanned aircraft (101) to land safely at step 410. In some embodiments, allowing the unmanned aircraft (101) to crash will only occur where the source of the command for the unmanned aircraft (101) to stop flying is authorized to crash the unmanned aircraft (101).

At optional step 408, the method 400 selects a preferred crash location. In one embodiment, step 408 comprises selecting a crash location from a plurality of crash locations. It is contemplated that control operations can be performed during the crash sequence that cause the unmanned aircraft (101) to crash at one location over another. For example, even if power to the flight engine (216) is cut, flaps or other air directors can be positioned to make the unmanned aircraft (101) fall sideways instead of vertically. Additionally, weights can be moved to shift the center of gravity to perform a similar function. In this manner, of there are multiple crash locations beneath the unmanned aircraft (101), in one or more embodiments step 408 can include selecting a more preferred one over a lesser preferred one.

The crash is then caused at step 409. In one embodiment, step 409 comprises ceasing operation of all propellers of the unmanned aircraft within a predetermined amount of time, such as one, two, or three seconds.

Illustrating by example, turning briefly back to FIG. 1, when the one or more processors (203) of the unmanned aircraft 101 cause the delivery of power to the flight engine (216) to cease, the unmanned aircraft begins its free fall 119. If the person's dog 121, Buster, were directly beneath the unmanned aircraft 101, the crash may injure him. However, by manipulating flaps or other air directing elements of the unmanned aircraft, the one or more processors (203) may be able to cause the unmanned aircraft 101 to crash in any of a plurality of crash locations 122, 123, 124. So as to avoid injuring Buster, in one embodiment the one or more processors select a more preferred crash location 123, i.e., away from Buster, over a less preferred crash location 122, i.e., atop Buster, and cause the unmanned aircraft 101 to crash at the preferred crash location 123.

Figure 5:
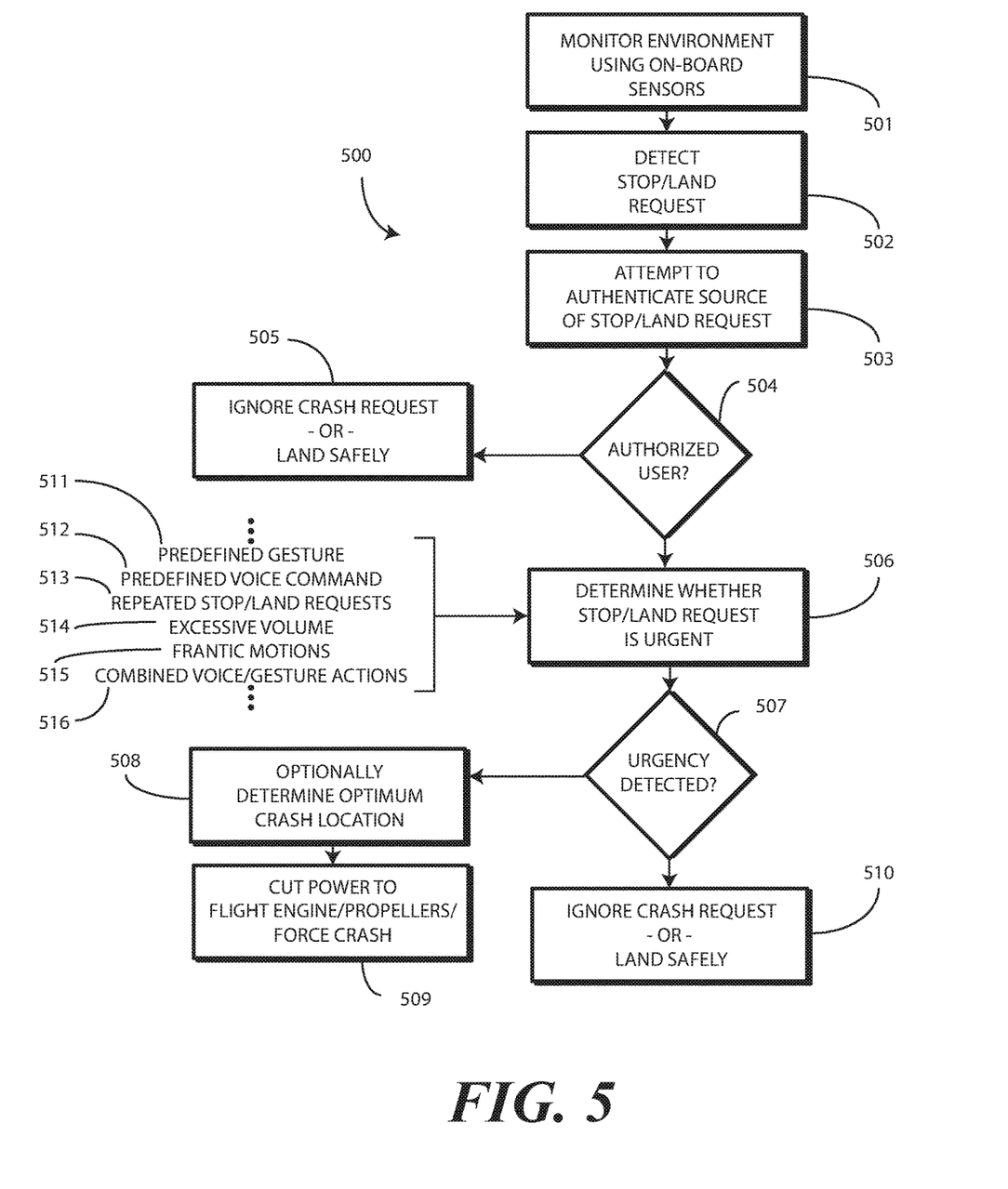
FIG. 5 illustrates another explanatory method in accordance with one or more embodiments of the disclosure.

Turning now to FIG. 5, illustrated therein is another explanatory method 500 for crashing an unmanned aircraft (101) in accordance with one or more embodiments of the disclosure. Many of the steps of FIG. 5 are similar to those of FIG. 4. However, the method 500 of FIG. 5 introduces the detection of urgency when receiving a command for the unmanned aircraft (101) to stop flying to determine whether to land the unmanned aircraft (101) safely without crashing or to instead crash the unmanned aircraft (101), thereby causing mechanical damage.

Beginning at step 501, the method 500 monitors an environment (108) about the unmanned aircraft (101) using one or more sensors as previously described. At step 502, the method 500 identifies, with one or more sensors of the unmanned aircraft (101), a command requesting the unmanned aircraft (101) to stop flying. As previously described, the command requesting the unmanned aircraft (101) to stop flying can include a predefined gesture, a predefined sound, a predefined voice command, a predefined type of sound, a predefined facial expression, a predefined context, or the presence of a companion device. These commands requesting the unmanned aircraft (101) can be used alone or in combination. Moreover, additional examples of commands requesting the unmanned aircraft (101) to stop flying will be obvious to those of ordinary skill in the art having the benefit of this disclosure.

At step 503, the method 500 attempts to authenticate a source of the command requesting the unmanned aircraft (101) to stop flying. Where the source of the command for the unmanned aircraft (101) to stop flying is not an authorized user, the method 500 can ignore the command or, alternatively, cause the unmanned aircraft (101) to land safely without crashing at step 505.

Where the source of the command for the unmanned aircraft (101) to stop flying is an authorized user, the method 500 can optionally attempt to determine whether the command requesting the unmanned aircraft (101) to stop flying is urgent at step 506. Step 406 can include performing image or video analysis, audio analysis, or other analysis of sensor data to determine whether the command for the unmanned aircraft (101) to stop flying is urgent.

Illustrating by example, step 506 can determine whether a predefined gesture 511 is included with the command for the unmanned aircraft (101) to stop flying. For instance, a single palm exposed to the image capture device (106) of the unmanned aircraft (101) can be a command for the unmanned aircraft (101) to stop flying, while two hands in the air (as shown in FIG. 1) may be an urgent command for the unmanned aircraft (101) to stop flying. Decision 507 can then distinguish between the former and the latter. In the former case, the one or more processors (203) of the unmanned aircraft (101) may land the unmanned aircraft (101) safely without crashing at step 510. By contrast, in the latter situation the one or more processors (203) may crash the unmanned aircraft (101) at step 509, optionally doing the same at a preferred spot selected at step 508.

In another embodiment, step 506 can determined whether a predefined voice command 512 is included with the command for the unmanned aircraft (101) to stop flying. For instance, a predefined voice command 512 of "Hey Drone, Land, Please" may constitute an non-urgent command for the unmanned aircraft (101) to stop flying, while the predefined voice command 512 "Run for Your Lives—Every Man for Himself!" may be an urgent command for the unmanned aircraft (101) to stop flying. Decision 507 can then distinguish between the former and the latter. In the former case, the one or more processors (203) of the unmanned aircraft (101) may land the unmanned aircraft (101) safely without crashing at step 510. By contrast, in the latter situation the one or more processors (203) may crash the unmanned aircraft (101) at step 509, optionally doing the same at a preferred spot selected at step 508.

In still another embodiment, step 506 can determined whether a predefined voice command 512 or a predefined gesture 511 is a repeated command 513 included with the command for the unmanned aircraft (101) to stop flying. For instance, a predefined voice command 512 of "Stop Drone" may constitute an non-urgent command for the unmanned aircraft (101) to stop flying, while the predefined voice command 512 "Stop Drone! Stop Drone! Stop Drone" may be an urgent command for the unmanned aircraft (101) to stop flying. Similarly, a stationary hand may be a command for the unmanned aircraft (101) to stop flying, while a repeated waving motion is an urgent command for the unmanned aircraft (101) to stop flying. Decision 507 can then distinguish between the former and the latter. In the former case, the one or more processors (203) of the unmanned aircraft (101) may land the unmanned aircraft (101) safely without crashing at step 510. By contrast, in the latter situation the one or more processors (203) may crash the unmanned aircraft (101) at step 509, optionally doing the same at a preferred spot selected at step 508.

In yet another embodiment, step 506 can determined whether an excessive volume 514 is included with the command for the unmanned aircraft (101) to stop flying. For instance, a conversationally toned voice command, e.g., 50-60 decibels (dB), of "Crash, man" may constitute an non-urgent command for the unmanned aircraft (101) to stop flying, while the same command, when yelled, e.g., over 75 dB, may be an urgent command for the unmanned aircraft (101) to stop flying. Decision 507 can then distinguish between the former and the latter by comparing, in one or more embodiments, the received audible sound to a predefined threshold, such as 60, 70, 75, 80, 90, or 100 dB. In the former case, the one or more processors (203) of the unmanned aircraft (101) may land the unmanned aircraft (101) safely without crashing at step 510. By contrast, in the latter situation the one or more processors (203) may crash the unmanned aircraft (101) at step 509, optionally doing the same at a preferred spot selected at step 508.

In another embodiment, step 506 can be determined when similar statements are emitted from multiple people. Illustrating by example, if one person yells, "Oh No," this may constitute an non-urgent command for the unmanned aircraft (101) to stop flying. By contrast, when a first person yells, "Oh No," and a second person yells, "bring it down," and a third person yells, "land now," this may constitute an urgent command for the unmanned aircraft (101) to stop flying. Decision 507 can then distinguish between the former and the latter by comparing, in one or more embodiments, the received audible sound to a predefined voice commands stored in the memory. In the former case, the one or more processors (203) of the unmanned aircraft (101) may land the unmanned aircraft (101) safely without crashing at step 510. By contrast, in the latter situation the one or more processors (203) may crash the unmanned aircraft (101) at step 509, optionally doing the same at a preferred spot selected at step 508.

In another embodiment, step 506 can determined whether frantic motion is included with the command for the unmanned aircraft (101) to stop flying. For instance, a voice command without any body motion may constitute an non-urgent command for the unmanned aircraft (101) to stop flying, while the same voice command with wildly flailing arms while the source is running for their life may be an urgent command for the unmanned aircraft (101) to stop flying. Decision 507 can then distinguish between the former and the latter. In the former case, the one or more processors (203) of the unmanned aircraft (101) may land the unmanned aircraft (101) safely without crashing at step 510. By contrast, in the latter situation the one or more processors (203) may crash the unmanned aircraft (101) at step 509, optionally doing the same at a preferred spot selected at step 508.

In still another embodiment, step 506 can determined whether a companion device 516 detects any of urgency cues while the command for the unmanned aircraft (101) to stop flying occurs. For instance, if a smart watch detects a racing pulse or heartbeat during a voice command, this may constitute an urgent command for the unmanned aircraft (101) to stop flying. By contrast, if the smart watch detects a resting heartbeat during the same command, this may not be urgent. Decision 507 can then distinguish between the former and the latter. In the latter case, the one or more processors (203) of the unmanned aircraft (101) may land the unmanned aircraft (101) safely without crashing at step 510. By contrast, in the former situation the one or more processors (203) may crash the unmanned aircraft (101) at step 509, optionally doing the same at a preferred spot selected at step 508.

It should be noted that the method 500 of FIG. 5 and the method (400) of FIG. 4 can be combined. For example, steps (406-407) of FIG. 4, where the authorization level of a source of a command to crash a drone is determined prior to crashing, can be incorporated into FIG. 5. Similarly, steps 506-507 of FIG. 5, where urgency is determined for a crash to occur, can be incorporated into FIG. 4. The various steps can be used in various combinations, as will be readily apparent to those of ordinary skill in the art having the benefit of this disclosure.

Figure 6:
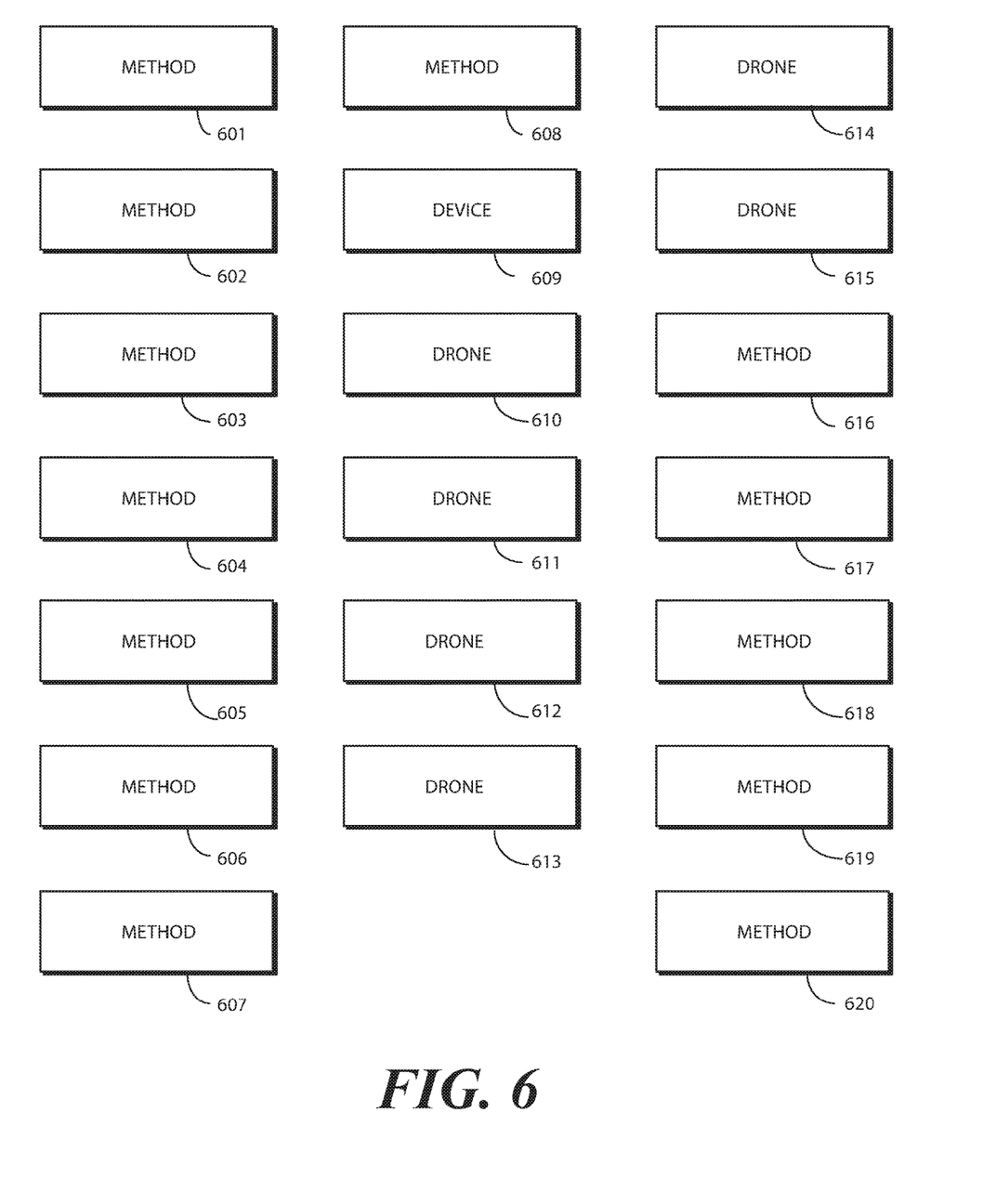
FIG. 6 illustrates one or more embodiments of the disclosure.

Turning now to FIG. 6, illustrated therein are various embodiments of the disclosure. At 601, a method of crashing an unmanned aircraft comprises detecting, with one or more sensors carried by the unmanned aircraft, a command for the unmanned aircraft to stop flying. At 601, the method comprises identifying, with the one or more sensors, an authorized user of the unmanned aircraft as a source of the command for the unmanned aircraft to stop flying. At 601, and where the authorized user is identified as the source of the command for the unmanned aircraft to stop flying, the method includes causing, with one or more processors carried by the unmanned aircraft, the unmanned aircraft to crash.

At 602, the method of 601 comprises determining, with the one or more processors, whether the authorized user is authorized to crash the unmanned aircraft. At 602, the causing the unmanned aircraft to crash at 601 occurs only where the authorized user is authorized to crash the unmanned aircraft.

At 603, the method of 601 further comprises determining, with the one or more processors, whether the command for the unmanned aircraft to stop flying is urgent. At 603, the causing the unmanned aircraft to crash at 601 occurs only when the command for the unmanned aircraft to stop flying is urgent.

At 604, the determining whether the command for the unmanned aircraft to stop flying is urgent of 603 comprises detecting, with the one or more sensors, a predefined gesture. At 605, the determining whether the command for the unmanned aircraft to stop flying is urgent of 603 comprises detecting, with the one or more sensors, a repeated gesture. At 606, the determining whether the command for the unmanned aircraft to stop flying is urgent of 603 comprises detecting, with the one or more sensors, a volume level associated with the command for the unmanned aircraft to stop flying exceeds a predefined volume level. At 607, the determining whether the command for the unmanned aircraft to stop flying is urgent of 603 comprises detecting, with a wireless communication device, a companion device operating within an environment of the unmanned aircraft.

At 608, the method of 601 comprises determining, with the one or more sensors, a preferred crash location from a plurality of crash locations. At 608, the causing the unmanned aircraft to crash of 601 occurs at the preferred crash location. At 609, the causing the unmanned aircraft to crash of 601 comprises cooling air or forcing buoyant gas out of a bladder or ballast tank to cause the unmanned aircraft 101 to crash.

At 610, an unmanned aircraft comprises one or more sensors identifying a predefined crash command from an environment about the unmanned aircraft. At 610, one or more processors, operable with the one or more sensors, determine whether a source of the predefined crash command is authorized to crash the unmanned aircraft. At 610, and where the source of the predefined crash command is authorized to crash the unmanned aircraft, the one or more processors crash the unmanned aircraft.

At 611, the unmanned aircraft of 610 further comprises a flight engine. At 611, the one or more processors crash the unmanned aircraft by turning the flight engine OFF.

At 612, the one or more processors of 610 further identify, from signals received form the one or more sensors, a preferred crash location from a plurality of crash locations. At 612, the crash occurring at the preferred crash location.

At 613, the predefined crash command of 610 comprises a predefined gesture. At 614, the predefined crash command of 610 comprises a predefined audio command. At 615, the predefined crash command of 610 comprises one of a repeated gesture or a repeated audio command.

At 616, a method of crashing an unmanned aircraft comprises identifying, with one or more sensors of the unmanned aircraft, a command requesting the unmanned aircraft to stop flying. At 616, the method comprises determining, with one or more processors operable with the one or more sensors, whether the command requesting the unmanned aircraft to stop flying is urgent. At 616, and where the command requesting the unmanned aircraft to stop flying is urgent, the method comprises causing, with the one or more processors, the unmanned aircraft to crash.

At 617, the method of 616 further comprises identifying a source of the command requesting the unmanned aircraft to stop flying. At 618, the method of 617 further comprises determining whether the source of the command requesting the unmanned aircraft to stop flying is authorized to crash the unmanned aircraft. At 617, the causing the unmanned aircraft to crash occurs only where the source of the command requesting the unmanned aircraft to stop flying is authorized to crash the unmanned aircraft.

At 619, the method of 618 further comprises selecting a crash location from a plurality of crash locations. At 619, the causing the unmanned aircraft to crash occurs at the crash location. At 620, the method of 618 further comprises landing the unmanned aircraft without crashing where the source of the command requesting the unmanned aircraft to stop flying is unauthorized to crash the unmanned aircraft.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. For example, using a secret "safe" word or a general "stop" command with voice authentication for crash commands limits who can make the unmanned aircraft crash, since it could cause damage. Similarly, using face recognition with a particular intuitive sound or gesture for the purpose of stopping the unmanned aircraft also limiting who can force a crash.

In some embodiments, users can be granted different levels of access or authorization credentials. A first, lower credential may allow a user to cause the unmanned aircraft to land or dock. By contrast, a second, higher credential can allow another user to cause the unmanned aircraft to stop immediately and crash. Embodiments of the disclosure further include a reliable hardware system, described above with reference to FIG. 2, for processing and prioritizing commands to ensure a low false rejection rate (FRR).

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of crashing an unmanned aircraft, the method comprising:
    detecting, with one or more sensors carried by the unmanned aircraft, a command for the unmanned aircraft to stop flying;
    visually identifying, with an image capture device the one or more sensors, an authorized user of the unmanned aircraft as a source of the command for the unmanned aircraft to stop flying; and
    where the authorized user is identified as the source of the command for the unmanned aircraft to stop flying and has authorization credentials to crash the unmanned aircraft, causing, with one or more processors carried by the unmanned aircraft, the unmanned aircraft to crash;
    further comprising determining, with the one or more processors, whether the command for the unmanned aircraft to stop flying is urgent, wherein the causing the unmanned aircraft to crash occurs only when the command for the unmanned aircraft to stop flying is urgent, wherein the determining whether the command for the unmanned aircraft to stop flying is urgent comprises detecting, with the one or more sensors, a volume level associated with the command for the unmanned aircraft to stop flying exceeds a predefined volume level.

2. The method of claim 1, wherein the authorization credentials permit the authorized user to cause damage to the unmanned aircraft.

3. The method of claim 1, the determining whether the command for the unmanned aircraft to stop flying is urgent further comprises detecting, with the one or more sensors, a pitch associated with the command for the unmanned aircraft to stop flying exceeds a predefined pitch level, wherein the causing the unmanned aircraft to crash occurs only when the command for the unmanned aircraft to stop flying exceeds both the predefined volume level and the predefined pitch level.

4. The method of claim 1, wherein the determining whether the command for the unmanned aircraft to stop flying is urgent further comprises detecting, with the one or more sensors, a predefined gesture throwing an object at the unmanned aircraft.

5. The method of claim 1, wherein the determining whether the command for the unmanned aircraft to stop flying is urgent further comprises detecting, with the one or more sensors, a repeated gesture swinging an object toward the unmanned aircraft.

6. The method of claim 1, wherein the predefined volume level is between 60 dB and 100 dB, inclusive.

7. The method of claim 1, wherein the determining whether the command for the unmanned aircraft to stop flying is urgent further comprises detecting, with the one or more sensors a predefined gesture covering an object with a garment.

8. The method of claim 1, further comprising determining, with the one or more sensors, a preferred crash location from a plurality of crash locations, wherein the causing the unmanned aircraft to crash occurs at the preferred crash location.

9. The method of claim 1, wherein the causing the unmanned aircraft to crash comprises cooling air or forcing buoyant gas out of a bladder or ballast tank to cause the unmanned aircraft to crash.

10. An unmanned aircraft, comprising:
at least one sensor receiving a first command from a source situated within an environment about the unmanned aircraft;
one or more processors actuating at least one other sensor in response to the at least one sensor receiving the first command from the source situated within the environment about the unmanned aircraft, the at least one other sensor identifying a predefined crash command received from the source situated within the environment about the unmanned aircraft; and
one or more processors, operable with the one or more sensors, the one or more processors:
visually determining, with an image capture device, whether a source of the predefined crash command is an authorized user of the unmanned aircraft; and
where the source of the predefined crash command is both the authorized user of the unmanned aircraft and has authorization credentials to crash the unmanned aircraft, crashing the unmanned aircraft.

11. The unmanned aircraft of claim 10, further comprising a flight engine, the one or more processors crashing the unmanned aircraft by turning the flight engine OFF.

12. The unmanned aircraft of claim 11, the one or more processors further identifying, from signals received from one or more sensors carried by the unmanned aircraft after turning the flight engine OFF, a preferred crash location from a plurality of crash locations, and manipulating air directing elements of the unmanned aircraft with the flight engine OFF such that the crashing occurs occurring at the preferred crash location.

13. The unmanned aircraft of claim 10, the predefined crash command comprising a predefined gesture simulating a dodging action.

14. The unmanned aircraft of claim 10, the predefined crash command comprising a predefined audio command comprising the words "don't" and "hit".

15. The unmanned aircraft of claim 10, the predefined crash command comprising both a repeated gesture and a repeated audio command.

16. The unmanned aircraft of claim 10, further comprising a memory, the one or more processors visually determining whether the source of the predefined crash command is the authorized user of the unmanned aircraft by comparing an image or depth scan to one or more predefined authentication references stored in the memory.

17. The unmanned aircraft of claim 10, the one or more processors visually determining whether the source of the predefined crash command is the authorized user of the unmanned aircraft by detecting lip movements of the source of the predefined crash command.

18. The unmanned aircraft of claim 10, the first command comprising an audible command.

19. The unmanned aircraft of claim 10, the predefined crash command comprising a gesture.

20. The unmanned aircraft of claim 10, the predefined crash command comprising a predefined phrase.

* * * * *